(12) United States Patent
Kim et al.

(10) Patent No.: US 12,490,278 B2
(45) Date of Patent: Dec. 2, 2025

(54) METHOD AND DEVICE FOR UPLINK TRANSMISSION OR DOWNLINK RECEPTION IN WIRELESS COMMUNICATION SYSTEM

(71) Applicant: LG ELECTRONICS INC., Seoul (KR)

(72) Inventors: Seonwook Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 381 days.

(21) Appl. No.: 18/020,056

(22) PCT Filed: Aug. 2, 2021

(86) PCT No.: PCT/KR2021/010039
§ 371 (c)(1),
(2) Date: Feb. 6, 2023

(87) PCT Pub. No.: WO2022/030909
PCT Pub. Date: Feb. 10, 2022

(65) Prior Publication Data
US 2023/0328753 A1 Oct. 12, 2023

(30) Foreign Application Priority Data
Aug. 5, 2020 (KR) .......... 10-2020-0098064

(51) Int. Cl.
*H04W 72/232* (2023.01)
*H04W 72/1268* (2023.01)

(52) U.S. Cl.
CPC ..... *H04W 72/232* (2023.01); *H04W 72/1268* (2013.01)

(58) Field of Classification Search
CPC ..... H04L 5/001; H04L 5/0053; H04L 5/0094; H04W 72/1268; H04W 72/232
See application file for complete search history.

(56) References Cited

U.S. PATENT DOCUMENTS 10,117,233 B2 * 10/2018 Lv .......................... H04W 72/23
10,939,428 B2 * 3/2021 Khoshnevisan ........ H04L 5/001
(Continued)

FOREIGN PATENT DOCUMENTS

CN 117242883 A * 12/2023 ............ H04W 72/23
EP 4027565 A1 * 7/2022 ........... H04L 5/0053
(Continued)

OTHER PUBLICATIONS

MediaTek Inc., "CR for 38.331 for Power Savings," 3GPP TSG-RAN2 Meeting #110-e, Online, R2-2006417, Jun. 2020, 886 pages.
(Continued)

*Primary Examiner* — Eric Nowlin
(74) *Attorney, Agent, or Firm* — LEE, HONG, DEGERMAN, KANG & WAIMEY

(57) ABSTRACT

Disclosed are a method and device for uplink transmission or downlink reception in a wireless communication system. A method for a terminal to perform uplink transmission or downlink reception according to an embodiment of the present disclosure comprises the steps of: monitoring a PDCCH in a search space set configured for a first cell, the PDCCH including first DCI for scheduling the uplink transmission or the downlink reception in at least one among the first cell or a second cell; and performing the uplink transmission or the downlink reception in at least one among the first cell or the second cell on the basis of the first DCI.

6 Claims, 10 Drawing Sheets

(56) References Cited

U.S. PATENT DOCUMENTS

| | | | |
|---|---|---|---|
| 11,051,289 B2* | 6/2021 | Lv | H04W 72/23 |
| 11,178,655 B2* | 11/2021 | Lee | H04L 5/0053 |
| 11,251,922 B2* | 2/2022 | Lee | H04W 72/23 |
| 11,304,077 B2* | 4/2022 | Bagheri | H04L 5/0044 |
| 11,336,421 B2* | 5/2022 | Seo | H04W 72/23 |
| 11,445,387 B2* | 9/2022 | Bagheri | H04W 72/0446 |
| 12,256,247 B2* | 3/2025 | Kim | H04W 72/0446 |
| 2015/0110055 A1* | 4/2015 | Lv | H04W 48/12 370/329 |
| 2019/0021074 A1* | 1/2019 | Lv | H04W 48/12 |
| 2019/0166589 A1* | 5/2019 | Yang | H04L 1/0046 |
| 2019/0313390 A1* | 10/2019 | Cheng | H04L 5/0053 |
| 2019/0342868 A1 | 11/2019 | Lee et al. | |
| 2020/0053580 A1* | 2/2020 | Bagheri | H04L 5/0035 |
| 2020/0053757 A1* | 2/2020 | Bagheri | H04L 5/10 |
| 2020/0154412 A1* | 5/2020 | Lee | H04W 72/23 |
| 2021/0014837 A1* | 1/2021 | Papasakellariou | H04L 5/0053 |
| 2021/0022122 A1* | 1/2021 | Khoshnevisan | H04L 5/0053 |
| 2021/0144599 A1* | 5/2021 | Awoniyi-Oteri | H04L 5/0053 |
| 2021/0377996 A1* | 12/2021 | Lee | H04L 5/0042 |
| 2022/0225284 A1* | 7/2022 | Hakola | H04W 72/0446 |
| 2022/0408464 A1* | 12/2022 | MolavianJazi | H04W 72/0453 |
| 2023/0124056 A1* | 4/2023 | Ren | H04L 5/0053 370/329 |
| 2023/0254857 A1* | 8/2023 | Moon | H04B 17/24 370/329 |
| 2023/0328753 A1* | 10/2023 | Kim | H04L 5/0053 370/329 |

FOREIGN PATENT DOCUMENTS

| | | | | |
|---|---|---|---|---|
| KR | 20170109680 | | 9/2017 | |
| KR | 20190068422 | | 6/2019 | |
| KR | 20240019158 A | * | 2/2024 | H04W 72/232 |
| WO | 2020001225 | | 1/2020 | |
| WO | WO-2022152962 A1 | * | 7/2022 | H04L 5/0053 |
| WO | WO-2022265432 A1 | * | 12/2022 | H04W 72/23 |
| WO | WO-2025065434 A1 | * | 4/2025 | H04W 72/12 |

OTHER PUBLICATIONS

PCT International Application No. PCT/KR2021/010039, International Search Report dated Nov. 5, 2021, 8 pages.

* cited by examiner

METHOD AND DEVICE FOR UPLINK TRANSMISSION OR DOWNLINK RECEPTION IN WIRELESS COMMUNICATION SYSTEM

CROSS-REFERENCE TO RELATED APPLICATION(S)

This application is the National Stage filing under 35 U.S.C. 371 of International Application No. PCT/KR2021/010039, filed on Aug. 2, 2021, which claims the benefit of earlier filing date and right of priority to Korean Application No. 10-2020-0098064, filed on Aug. 5, 2020, the contents of which are all incorporated by reference herein in their entirety.

TECHNICAL FIELD

The present disclosure relates to a wireless communication system, and more particularly, to a method and apparatus for transmitting and receiving an uplink or downlink in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and apparatus for transmitting and receiving uplink or downlink.

In addition, an additional technical problem of the present disclosure is to provide a method and apparatus for transmitting and receiving uplink or downlink based on DCI scheduling data to be transmitted in at least one cell.

The technical objects to be achieved by the present disclosure are not limited to the above-described technical objects, and other technical objects which are not described herein will be clearly understood by those skilled in the pertinent art from the following description.

In a method for uplink transmission or downlink reception by a user equipment (UE) in a wireless communication system according to an embodiment of the present disclosure, the method comprises: monitoring a physical downlink control channel (PDCCH) including first downlink control information (DCI) for scheduling the uplink transmission or the downlink reception in at least one of a first cell or a second cell, in a search space (SS) set configured for the first cell; and performing the uplink transmission or the downlink reception in at least one of the first cell and the second cell based on the first DCI, and a number of PDCCH candidates for each aggregation level (AL) for the search space set may be configured based on at least one of a number of PDCCH candidates for each AL corresponding to the first cell or a number of PDCCH candidates for each AL corresponding to the second cell.

In a method for uplink reception or downlink transmission by a base station in a wireless communication system according to an embodiment of the present disclosure, the method comprises: transmitting, to a user equipment (UE), a first DCI for scheduling the uplink transmission or the downlink reception by the UE in at least one of a first cell or a second cell included in a physical downlink control channel (PDCCH) monitored by the UE in a search space set configured for the first cell; and performing the uplink reception from the UE or the downlink transmission to the UE based on the first DCI, and a number of PDCCH candidates per aggregation level (AL) for the search space set may be configured based on at least one of a number of PDCCH candidates per AL corresponding to the first cell or a number of PDCCH candidates per AL corresponding to the second cell.

According to an exemplary embodiment of the present disclosure, data transmission efficiency may be increased by applying a cross-carrier scheduling method for scheduling data to be transmitted to a plurality of cells through one DCI.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
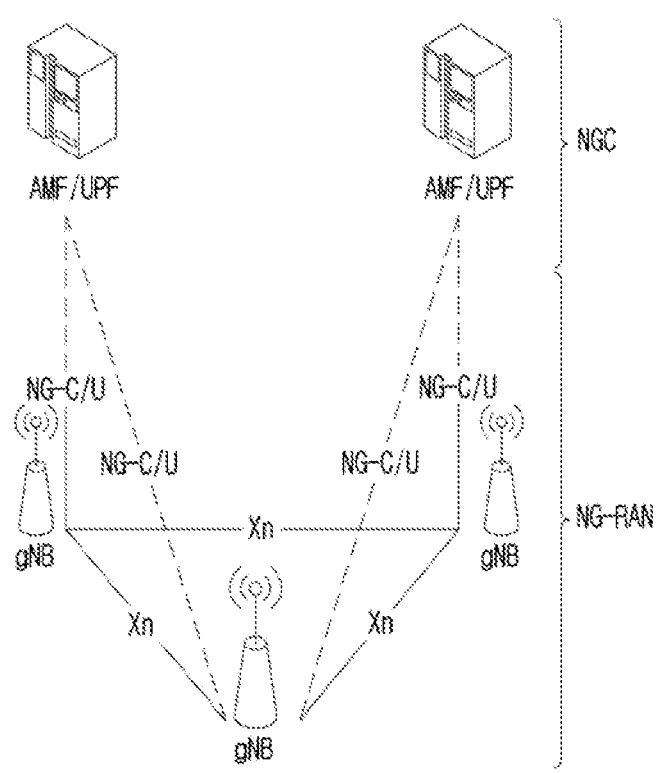
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.
- BM: beam management
- CQI: Channel Quality Indicator
- CRI: channel state information-reference signal resource indicator
- CSI: channel state information
- CSI-IM: channel state information-interference measurement
- CSI-RS: channel state information-reference signal
- DMRS: demodulation reference signal
- FDM: frequency division multiplexing
- FFT: fast Fourier transform
- IFDMA: interleaved frequency division multiple access
- IFFT: inverse fast Fourier transform
- L1-RSRP: Layer 1 reference signal received power
- L1-RSRQ: Layer 1 reference signal received quality
- MAC: medium access control
- NZP: non-zero power
- OFDM: orthogonal frequency division multiplexing
- PDCCH: physical downlink control channel
- PDSCH: physical downlink shared channel
- PMI: precoding matrix indicator
- RE: resource element
- RI: Rank indicator
- RRC: radio resource control
- RSSI: received signal strength indicator
- Rx: Reception
- QCL: quasi co-location
- SINR: signal to interference and noise ratio
- SSB (or SS/PBCH block): Synchronization signal block (including PSS (primary synchronization signal), Sss (secondary synchronization signal) and PBCH (physical broadcast channel))
- TDM: time division multiplexing
- TRP: transmission and reception point
- TRS: tracking reference signal
- Tx: transmission
- UE: user equipment
- ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
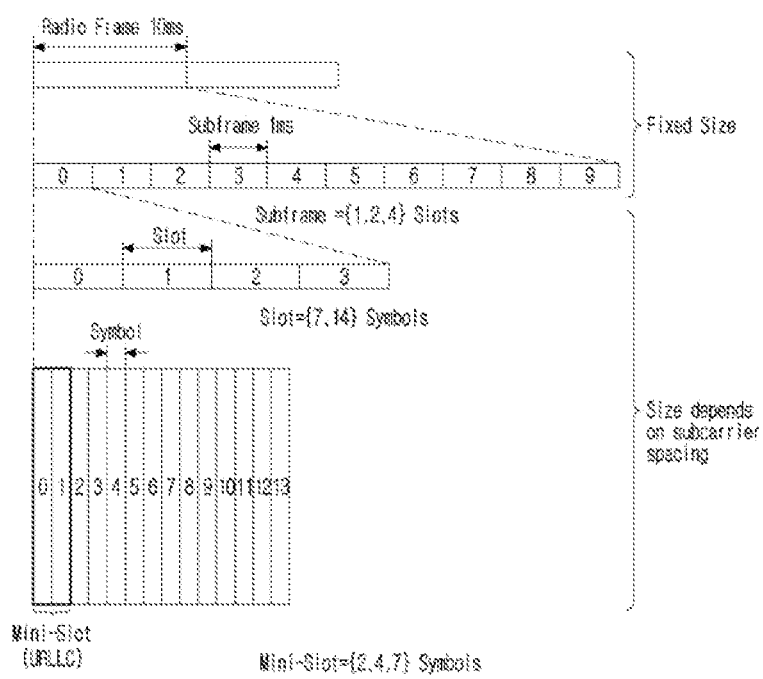
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480.103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
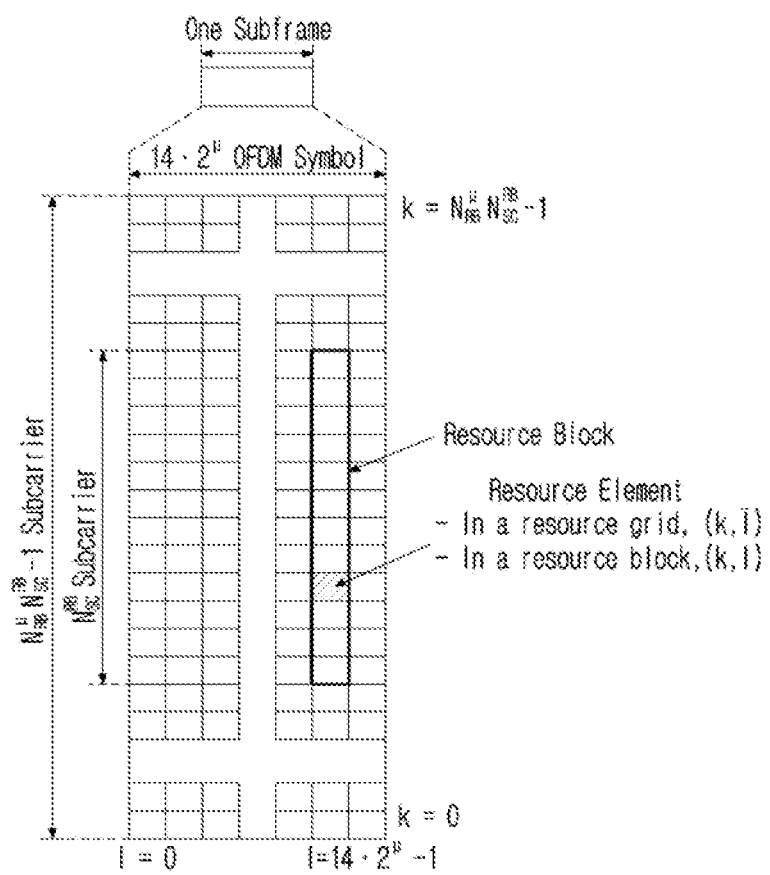
FIG. 3 illustrates a resource grid in a wireless communication system to which the present disclosure may be applied.

FIG. 2 is an example on μ=2 (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with 14·$2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absolute FrequencyPointA represents a frequency-position of point A expressed as in ARFCN (absolute radio-frequency channel number).

Common resource blocks are numbered from 0 to the top in a frequency domain for a subcarrier spacing configuration u. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
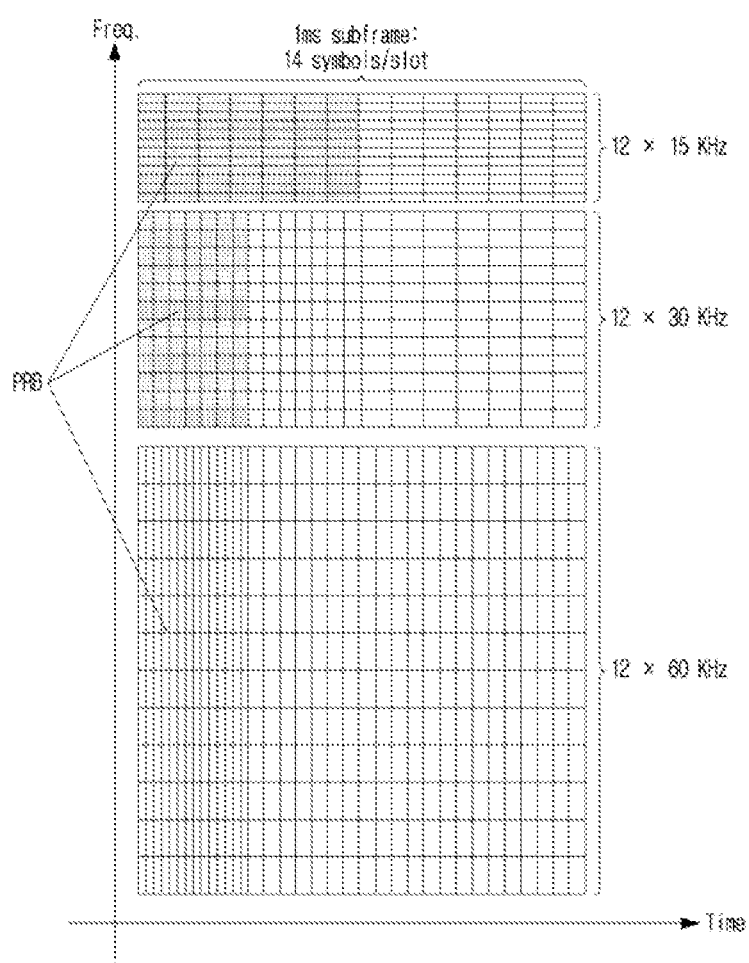
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
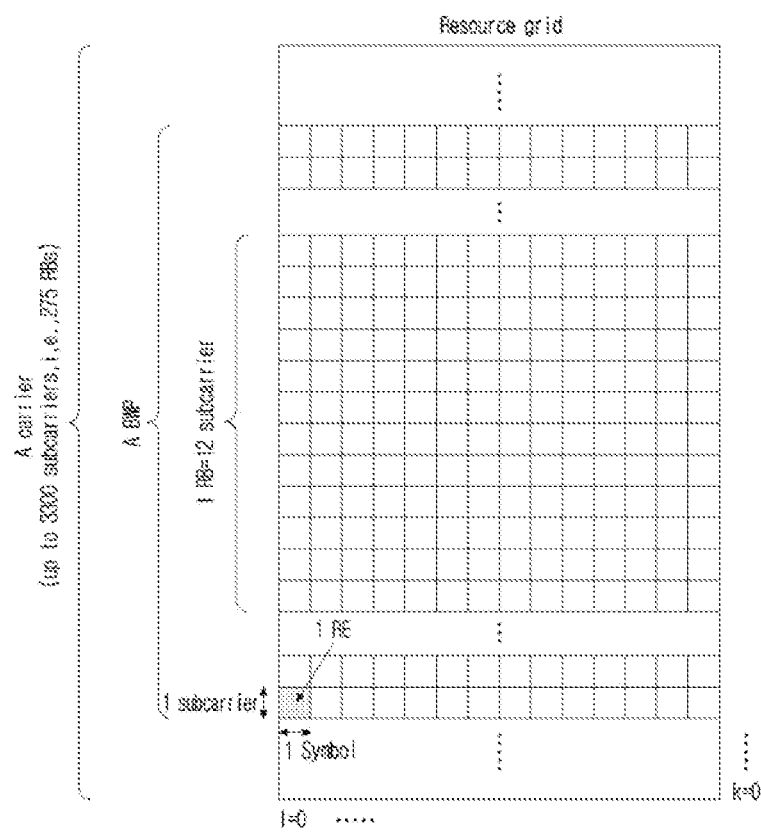
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHZ may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a sub-carrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
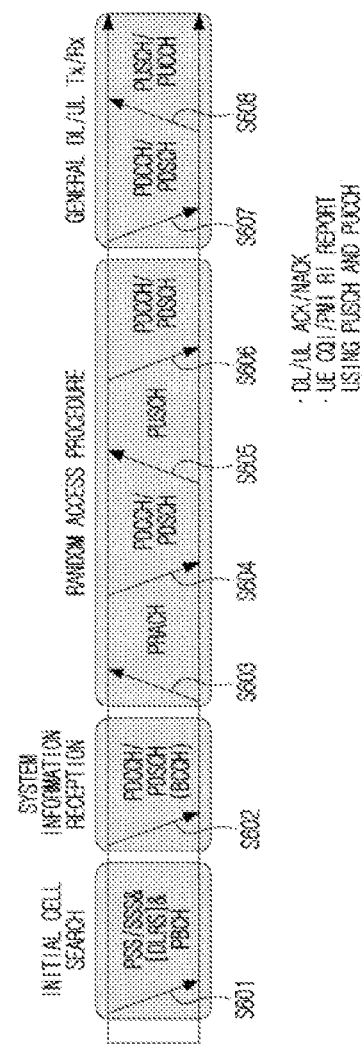
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CA (Carrier Aggregation)

In LTE and NR systems, carrier aggregation (CA) is supported. CA refers to a method of supporting at least one of a wider uplink bandwidth or a downlink bandwidth by collecting at least one of a plurality of uplink component carriers (CCs) or downlink component carriers. In this case, CC may be replaced with an equivalent term such as cell, serving cell, or carrier.

The frequency bandwidth of each CC may be determined independently. Each CC may be adjacent to each other in the frequency domain, but is not limited thereto and may be non-adjacent to each other. In addition, a symmetric CA may be configured using the same number of uplink CCs and downlink CCs, and an asymmetric CA may be configured by making the number of uplink CCs and downlink CCs different from each other.

Additionally or alternatively, control information may be configured to be transmitted and received only through a specific CC. In this case, a specific CC may be referred to as a primary CC, and the remaining CCs may be referred to as secondary CCs. For example, when cross-carrier scheduling (CCS) is applied, a PDCCH carrying downlink control information (DCI) for downlink or uplink scheduling is transmitted through downlink CC #0 and the PDSCH scheduled by the PDCCH may be transmitted through downlink CC #2. In this case, CC #0 may be referred to as a primary CC, and CC #2 may be referred to as a secondary CC.

For the application of CCS, a carrier indicator field (CIF) may be used. The CIF may indicate which downlink CC or uplink CC the PDSCH or PUSCH indicated by the DCI carried by the PDCCH is transmitted and received through. Configuration for the presence or absence of CIF in the PDCCH may be enabled semi-persistently UE-specific (or UE group-specific) by higher layer signaling (e.g., RRC signaling).

CIF being disabled may mean that there is no CIF in the PDCCH as CCS is not configured. If the CIF is absent in the PDCCH, the PDCCH transmitted on the downlink CC may allocate (or schedule) PDSCH resources on the downlink CC and PUSCH resources on a single uplink CC linked with the downlink CC. That is, when there is no CIF, a scheduling cell and a scheduled cell are the same.

That CIF is enabled may mean that CIF exists in PDCCH as CCS is configured. If the CIF exists in the PDCCH, the PDCCH on the downlink CC may allocate a PDSCH or PUSCH resource on one downlink/uplink CC among a plurality of merged downlink/uplink CCs using the CIF. At this time, the DCI (DCI in a format extended to have a CIF) includes a CIF of fixed bits (e.g., 0 to 3 bits), and the position of the CIF may be fixed regardless of the DCI format size.

And, if the CIF exists in the PDCCH, the base station may allocate a monitoring downlink CC (set) to reduce the complexity of PDCCH blind decoding (BD) of the UE. Accordingly, for PDSCH/PUSCH scheduling, the UE may detect/decode the PDCCH only in the monitoring downlink CC. In addition, the base station may transmit the PDCCH only through the monitoring downlink CC (set). The monitoring downlink CC set may be configured in a UE-specific, UE-group-specific or cell-specific manner. Here, the blind decoding operation may mean an operation of finding a PDCCH in a search space (SS). In addition, the monitoring operation may mean an operation in which the terminal attempts to decode the received PDCCH candidates according to the DCI format.

For example, it is assumed that three downlink CCs are merged and downlink CC A is configured as a PDCCH CC (i.e., a CC that receives the PDCCH). In this case, the downlink CCs A, B, and C may be referred to as serving CCs, serving carriers, serving cells, and the like. When CIF is not available (i.e., when CIF is absent in PDCCH), downlink CCs A, B, and C may transmit only PDCCHs scheduling their own PDSCHs. That is, when there is no CIF in the PDCCH, a self-carrier scheduling (SCS) scheme may be applied.

On the other hand, if CIF is enabled by UE-specific (or UE-group-specific or cell-specific) higher layer signaling (i.e., CIF exists in the PDCCH), a specific CC (e.g., downlink CC A) may transmit not only a PDCCH for scheduling a PDSCH of downlink CC A using CIF, but also a PDCCH for scheduling PDSCHs of other CCs. And, PDCCH is not transmitted in downlink CCs B and C. That is, when the CIF exists in the PDCCH, the CCS scheme may be applied.

In describing the present disclosure, the term cell may be interpreted according to context, and may mean, for example, a serving cell. In addition, a cell may be composed of one downlink component carrier (CC) and 0 to 2 uplink CCs. For example, a cell may be composed of one downlink CC and one uplink CC.

Additionally or alternatively, a cell may consist of multiple CCs. For example, a cell may be composed of a plurality of downlink CCs and 0 to N (N is an integer greater than or equal to 1) uplink CCs. That is, the term cell may mean a specific downlink CC constituting one cell.

And, for clarity and convenience of description of the present disclosure, terms related to cells may be defined as follows.

In the case of a terminal where CA is configured, a primary cell (PCell) refers to a cell operating at a primary frequency in which a terminal performs an initial connection establishment procedure or initiates a connection re-establishment procedure.

A secondary cell (SCell), in the case of a UE configured with CA, means a cell that additionally provides radio resources in addition to the special cell.

The special cell (SpCell) refers to a PCell of a master cell group (MCG) or a PScell of an SCG when a dual connectivity (DC) operation is performed, and refers to a PCell when a non-DC operation is performed.

A primary secondary cell (PSCell) refers to a cell of a secondary cell group (SCG) to which a terminal performs random access when a dual connectivity operation is performed.

A serving cell refers to a cell configured for a terminal in an RRC CONNECTED state. When carrier aggregation (CA)/dual connectivity (DC) is not configured, only one serving cell (i.e., PCell) may exist. When CA/DC is configured, the serving cell may represent a cell set including special cell(s) and all SCells.

Hereinafter, the method proposed in the present disclosure will be described in detail.

For smooth migration to the NR system, a scenario in which NR services may be provided at the base station by performing a software upgrade on a base station provided with an existing LTE service may be considered. In this case, the base station provides both the LTE service and the NR service in a specific band, so that the existing ITE terminal may receive the LTE service and the NR terminal may receive the NR service. In this case, providing LTE service may mean providing a service in which an always-on signal such as a cell-specific reference signal (CRS) is transmitted and PDCCH transmission is reserved at the beginning of every subframe.

For example, a situation in which the base station has carrier #1 (e.g., 1.8 GHZ) in which the LTE system and the NR system coexist and operate and carrier #2 (e.g., 3.5 GHZ) in which only the NR system is operated and the NR terminal communicating with the corresponding base station simultaneously accesses each carrier by combining (i.e. by performing CA) carrier #1 and carrier #2 may be assumed. Here, considering wide coverage, which is a characteristic of low frequency, it may be desirable to set carrier #1 as a primary cell.

In this case, the base station may need to provide the LTE service simultaneously with the NR service on carrier #1. Under these conditions, when the base station provides the NR service, a problem that the base station may lack space for transmitting the PDCCH toward the NR terminal through carrier #1 may occur.

In order to overcome the above-described problem, a method of configuring a DCI for scheduling downlink/uplink data transmitted in a PCell to be transmitted in a secondary cell may be considered. As another method, a method of simultaneously scheduling downlink/uplink data to be transmitted in the PCell as well as downlink/uplink data to be transmitted in the SCell through one scheduling DCI transmitted in the SCell may be considered. This scheduling method (i.e., a method of scheduling downlink or uplink data to be transmitted in a plurality of cells including the specific cell through one scheduling DCI transmitted in the specific cell) may be generally referred to as multi-component carrier (multi-CC) scheduling. In this case, the specific cell may be implemented with all types of cells such as PCell or SCell.

Multi-CC scheduling proposed in this disclosure may mean scheduling downlink/uplink data to be transmitted on a corresponding cell and/or one or more other cells through one scheduling DCI transmitted on a specific cell.

In addition, the present disclosure discloses a method for configuring the number of PDCCH candidates for each DCI and calculating (or interpreting) the number of PDCCH candidates for each scheduled cell, when the terminal is capable of both DCI reception for scheduling downlink/uplink data to be transmitted in one cell and DCI reception for scheduling downlink/uplink data to be transmitted in a plurality of cells on a specific cell.

DCI Configuration Method for Scheduling Data to be Transmitted in a Plurality of Cells PDSCH or PUSCH transmitted in one cell may be scheduled through PDCCH on the cell, and such a scheduling method may be collectively referred to as self-carrier scheduling (SCS). In describing the present disclosure, a cell may mean an (active) BWP within a corresponding cell.

In addition, a cell in which data such as PDSCH or PUSCH is transmitted (i.e., a scheduled cell) and a cell in which a PDCCH for scheduling the data is transmitted (i.e., a scheduling cell) may be configured differently. This scheduling method may be collectively referred to as cross-carrier scheduling (CCS).

For example, CCS-related configuration information for configuring CCS in at least one cell may be configured based on 'CrossCarrierSchedulingConfig', which is a higher layer parameter. At this time, an exemplary configuration of 'CrossCarrierSchedulingConfig' may be shown in Table 6 below.

TABLE 6

```
CrossCarrierSchedulingConfig ::=    SEQUENCE {
    schedulingCellInfo              CHOICE {
        own                         SEQUENCE
{           -- Cross carrier scheduling: scheduling cell
            cif-Presence            BOOLEAN
        },
        other                       SEQUENCE
{           -- Cross carrier scheduling: scheduled cell
            schedulingCellId        ServCellIndex,
            cif-InSchedulingCell    INTEGER (1..7)
        }
    },
    ...}
```

In Table 6, 'cif-presence' indicates whether a carrier indicator field (CIF) exists in the DCI carried by the PDCCH, and 'cif-InSchedulingCell' may indicate a CIF value used in a scheduling cell to indicate a grant or assignment applicable in the corresponding cell.

A CIF value may be configured in a DCI (e.g., DCI format 0_1/0_2/1_1/1_2) scheduling the PDSCH or PUSCH. The CIF value of the cell itself is 0, and the CIF value of another cell (a value set by 'cif-InSchedulingCell' in Table 6) may have a value of 1 to 7, but is not limited thereto.

And, the CIF value may be used to determine a PDCCH candidate. For example, the number of PDCCH candidates configured to be monitored by the UE may be determined based on an aggregation level (AL) of a search space (SS) configured in a serving cell corresponding to a CIF value.

Additionally or alternatively, a PDCCH monitoring operation in an SS set configured in a scheduled cell may be performed at a PDCCH monitoring occasion (MO) interlocked with an SS set having the same index as the SS set in the scheduling cell. Also, when PDCCH monitoring of a cell scheduled in the SS set is performed in a scheduling cell, the number of PDCCH candidates for each AL configured in the SS set of the scheduled cell may be applied. That is, the number of PDCCH candidates for each AL configured in the SS set of the scheduled cell may be inherited as it is. Here, the PDCCH MO may be determined for each SS set s in a control resource set (CORESET) p. Up to 10 SS sets may be associated with one CORESET, and each SS set may be identified by an SS set index.

In SS set #S set in each cell (e.g., cell #A and cell #B), the number of PDCCH candidates for each AL may be defined (or set) as N_A(n) and N_B(n), where n means an AL value. At this time, if the CCS for determining the scheduling cell for cell #B as cell #A is configured, the UE may perform monitoring of PDCCHs in PDCCH MOs configured in SS set #s in cell #A.

For example, the UE may monitor N_A(n) PDCCH candidates for each AL for DCI formats configured in SS set #s of cell #A, and monitor N_B(n) PDCCH candidates for each AL for DCI formats configured in SS set #s of cell #B. Here, monitoring the PDCCH candidate for the DCI formats configured in SS set #s may mean monitoring the PDCCH candidate to detect (or decode) the DCI format configured in SS set #s.

In addition, the PDCCH transmitted from cell #A may schedule data transmitted from cell #B (e.g., PDSCH or PUSCH), and in this case, the relationship established between cell #A and cell #B may be referred to as a CCS relationship for convenience of description. Also, monitoring PDCCHs may mean monitoring PDCCH candidates.

In this disclosure, a method for coexistence with a single-CC DCI, a method for configuring the number of PDCCH candidates for multi-CC DCI, and a method for calculating the number of PDCCH candidates for each of multiple scheduled cells scheduled by the multi-CC DCI are disclosed, when multi-CC DCI capable of simultaneously scheduling cell #A and cell #B is configured.

Embodiment 1

Embodiment 1 is an embodiment of a method for operating a multi-CC DCI capable of scheduling data to be transmitted to a plurality of cells and a single CC capable of scheduling data to be transmitted to a single cell.

When SS set #s are configured for cell #A and cell #B, and a CCS relationship is established between cell #A and cell #B, the operation method of the multi-CC DCI capable of simultaneously scheduling cell #A and cell #B and the single CC DCI capable of scheduling a single cell can be set/applied as one of the following options.

Option 1

Multi-CC DCI may always be defined to schedule both cell #A and cell #B. For example, multi-CC DCI may be used to schedule both cell #A and cell #B, and single CC DCI may be used to schedule only one cell, cell #A or cell #B.

At this time, the UE may expect to receive all multi-CC DCI, single CC DCI for cell #A, and single CC DCI for cell #B from cell #A. Expecting by the UE to receive both single CC DCI and multi-CC DCI for cell #A and cell #B, respectively, in cell #A may mean that the UE may monitor a PDCCH including a single CC DCI and a PDCCH including a multi-CC DCI for each of cell #A and cell #B.

If scheduling of only one cell through the multi-CC DCI is allowed when the difference between the multi-CC DCI size and the single CC DCI size is large, PDCCH overhead may be relatively large. Therefore, it may be advantageous in terms of PDCCH reliability and transmission efficiency to operate option 1 together with multi-CC DCI and single CC DCI that schedules data for each cell.

Option 2

Through Multi-CC DCI, both cell #A and cell #B may be scheduled, or only a specific cell (or some cells) may be scheduled. The specific cell may include a scheduling cell (i.e., cell #A) or may include a PCell (or PSCell).

Here, the UE may expect to receive both a multi-CC DCI scheduling both cell #A and cell #B in cell #A or scheduling one specific cell (cell #A or cell #B) and a single CC DCI that performs single scheduling that cannot be scheduled through multi-CC DCI. At this time, expecting the UE to receive both the multi-CC DCI and the single CC DCI may mean that the UE monitors the PDCCH including the multi-CC DCI and the PDCCH including the single CC DCI.

In addition, a single cell that cannot be scheduled through multi-CC DCI may mean a SCell, but is not limited thereto. For example, if it is defined to be able to schedule both cell #A and cell #B or only cell #A through multi-CC DCI, the UE may expect to receive multi-CC DCI and single CC DCI for cell #B from cell #A.

Option 3

Through Multi-CC DCI, it may be defined that not only scheduling of both cell #A and cell #B but also scheduling of only each cell (e.g., scheduling of only cell #A or only cell #B) is possible.

At this time, the UE may expect to receive only multi-CC DCI from cell #A and not receive DCI for scheduling a single cell (i.e., single CC DCI for cell #A and cell #B respectively). Here, that the UE expects only reception of multi-CC DCI from cell #A may mean that the UE monitors a PDCCH including multi-CC DCI in an SS set configured for cell #A.

Since it is possible to schedule only one cell among a plurality of cells including cell #A and cell #B through Multi-CC DCI, single CC DCI may not be used separately. Accordingly, the UE may expect reception of only multi-CC DCI and may not expect reception of single CC DCI.

If options 2 and 3 above apply, If the difference between the multi-CC DCI size and the single CC DCI size is not large, only one cell may be scheduled through the multi-CC DCI, so the number of different DCI sizes assumed by the UE and the implementation complexity of the UE may be reduced. Specifically, when the difference between the multi-CC DCI size and the single CC DCI size is not large, even if only one cell is scheduled through the multi-CC DCI, overhead due to PDCCH transmission may not significantly increase. Therefore, even if options 2 and 3 are applied, PDCCH transmission efficiency does not significantly decrease, and implementation complexity of the UE can be reduced.

Additionally or alternatively, the multi-CC DCI described in each of options 1 to 3 may be defined in a separate (DCI) format. The UE may monitor the SS set configured in the scheduling cell in order to detect the multi-CC DCI defined in a separate format. And, according to the format type, the type of cell that the multi-CC DCI may schedule may be predefined or preconfigured.

Additionally or alternatively, the type of cell that the multi-CC DCI described in each of options 1 to 3 can schedule may be configured by higher layer signaling (e.g., RRC signaling). For example, when receiving an RRC message including configuration information related to DCI scheduling both cell #A and cell #B, the UE may monitor the SS set configured in cell #A to detect the multi-CC DCI described in option 1 and the single-CC DCI for scheduling each single cell.

Embodiment 2

Embodiment 2 is an embodiment of a method for configuring the number of PDCCH candidates for each AL for monitoring multi-CC DCI. When SS set #s are configured for cell #A and cell #B, and a CCS relationship is established between cell #A and cell #B, one of the following methods may be configured/applied to configure the number of PDCCH candidates for each AL of multi-CC DCI capable of simultaneously scheduling cell #A and cell #B. In this case, the number of PDCCH candidates for each AL of the multi-CC DCI may mean the number of PDCCH candidates for each AL monitored to detect the multi-CC DCI.

Method 1

A separate SS set #s corresponding to multi-CC DCI may be configured on Cell #A, and N_C(n), which is the number of PDCCH candidates for each AL of multi-CC DCI, may be configured through the SS set #s'. Here, n means the AL value. As another example, N_C(n), the number of PDCCH candidates for each AL of multi-CC DCI within the same SS set #s, may be configured separately. In this case, the same SS set #s may mean SS set #s set on cell #A and cell #B. Also, the same SS set #s may mean SS sets having the same index (#s) set in cell #A and cell #B.

Method 1 may be characteristically applied in a situation configured as option 1. When option 1 is followed, since multi-CC DCI cannot schedule data to be received in a single cell, it may be desirable to separately configure the number of PDCCH candidates for detecting multi-CC DCI as in method 1.

Method 2

The number of PDCCH candidates for each AL of Multi-CC DCI may be configured to N_A(n) (or, equivalent to (or, as part of) N_B(n)), which is the number of PDCCH candidates for each AL of multi-CC DCI on the same SS set #s. In this case, n may be an AL value.

Being configured as part of N_A(n) may mean that it is set to a value larger than 0 and smaller than N_A(n) (or N_B(n)), or configured to a value determined by a specific ratio of N_A(n) (or N_B(n)). In this case, the specific ratio may mean a value greater than 0 and less than 1. If it is configured to only a part of N_A(n) (or N_B(n)), the configured value may be 1/K (or alpha) of N_A(n), and the K (e.g., K=2) value (or alpha (e.g., alpha=0.5) value) may be predefined or configured (e.g., configured through higher layer signaling).

Method 2 may be characteristically applied in a situation configured as option 2. For example, if it is defined to be able to schedule both cell #A and cell #B or only cell #A through multi-CC DCI, the number of PDCCH candidates of multi-CC DCI for each AL on the same SS set #s may be configured to N_A(n) or a part of N_A(n). In addition, when the multi-CC DCI schedules both cell #A and cell #B or only cell #B, the number of PDCCH candidates of multi-CC DCI for each AL on the same SS set #s may be configured to N_B(n) or a part of N_B(n).

Method 3

The number of PDCCH candidates for each AL of Multi-CC DCI may be configured equal to or part of 'N_A(n)+N_B(n)', the number of PDCCH candidates for each AL of multi-CC DCI on the same SS set #s. As described above, being configured as a part of 'N_A(n)+N_B(n)' may mean that it is configured to a value greater than 0 and smaller than 'N_A(n)+N_B(n)' or configured to a value determined by a specific ratio of 'N_A(n)+N_B(n)'. In this case, the specific ratio may mean a value greater than 0 and less than 1. When configured to some value of 'N_A(n)+N_B(n)', the value may be 1/K (or alpha) of 'N_A(n)+N_B(n)', and the K (e.g., K=2) value (or alpha (e.g., alpha=0.5) value) may be defined in advance or configured by higher layer signaling.

Method 3 may be characteristically applied in a situation configured as option 3. That is, if it is defined that both cell #A and cell #B are scheduled through multi-CC DCI, or each of cell #A and cell #B is scheduled, the number of PDCCH candidates of multi-CC DCI for each AL on the same SS set #s may be configured equal to or part of 'N_A(n)+N_B(n)'.

Embodiment 3

Embodiment 3 is an embodiment of a method for calculating the number of PDCCH candidates for each scheduled cell of multi-CC DCI.

In the case of the operation of the existing UE, at least one of the maximum number of PDCCH candidates allowed per cell or/and slot (or per span) or the maximum number of non-overlapped control channel elements (CCEs) may be defined.

For example, as shown in Table 7 below, the maximum number of PDCCH candidates allowed per (serving) cell or/and slot (or section) may be determined according to subcarrier spacing (SCS) configurations.

TABLE 7

| Subcarrier spacing (kHz) | Maximum number of PDCCH candidates per serving cell and per slot |
| --- | --- |
| 15 | 44 |
| 30 | 36 |
| 60 | 22 |
| 120 | 20 |

As another example, as shown in Table 8 below, the maximum number of non-overlapping CCEs for each cell or/and each slot may also be determined according to the subcarrier interval configuration.

TABLE 8

| Subcarrier spacing (kHz) | Maximum number of non-overlapping CCEs per serving cell and per slot |
| --- | --- |
| 15 | 56 |
| 30 | 56 |
| 60 | 48 |
| 120 | 32 |

The UE may not expect SS set configuration that exceeds the maximum number of PDCCH candidates allowed for each scheduled cell (or each slot) or the maximum number of non-overlapping control channel elements. Exceptionally, for a UE-specific SS set of PCell (or PSCell), the maximum number of PDCCH candidates allowed per cell (or per slot) or the maximum number of non-overlapping control channel elements may be exceeded. At this time, some UE-specific SS sets may be dropped in the corresponding slot (or section) and PDCCH monitoring operation may not be performed.

Additionally or alternatively, when CCS is applied, the number of PDCCH candidates for monitoring per slot (or period) and the number of non-overlapping CCEs may be separately counted for each scheduled cell. That is, when a multi-CC DCI for scheduling a plurality of cells is configured, a method of calculating the number of PDCCH candidates configured in the DCI for each of a plurality of scheduled cells must be determined.

For example, when SS set #s are configured for cell #A and cell #B and a CCS relationship is established between cell #A and cell #B, the number of PDCCH candidates (or the maximum number of PDCCH candidates) for each AL of multi-CC DCI capable of simultaneously scheduling cell #A and cell #B may be defined as X(n). And, in determining whether to allow the maximum number of allowed PDCCH candidates for each cell, the number of PDCCH candidates for each AL for cell #A of multi-CC DCI is defined as X_A(n), and the number of PDCCH candidates for each AL for cell #B of multi-CC DCI may be defined as X_B(n). Here, n means the AL value.

Based on a configured (or defined) situation, one of the alternatives (alternatives 1 to 3) described below may be applied to determine the maximum number of allowed PDCCH candidates for each cell. That is, by applying one of the alternatives 1 to 3, the number (or maximum number) of PDCCH candidates for the scheduled cell may be calculated.

Alternative 1

Alternative 1 is a scheme of configuring the number of PDCCH candidates for each AL of multi-CC DCI of each scheduled cell to be the same as the number of PDCCH candidates for each AL of multi-CC DCI. That is, each of X_A(n) and X_B(n) may be equal to the value of X(n).

Specifically, Alternative 1 is a method in which the number of PDCCH candidates is calculated as an X(n) value for all of a plurality of scheduled cells (although the scheduled cells may actually be both cell #A and cell #B). That is, the number of PDCCH candidates for each of cell #A and cell #B may be counted as the number of PDCCH candidates for each AL of multi-CC DCI.

For example, alternative 1 may be applied when X(n) is set equal to the value of N_C(n) as in method 1. Specifically, when the number of PDCCH candidates for each AL of multi-CC DCI is set to a value (N_C(n)) different from the number of PDCCH candidates for each cell, N_C(n) and X(n) may be the same value. In addition, the number of PDCCH candidates for each AL of the multi-CC DCI of the scheduled cell may be calculated as X(n).

As another example, As in method 3, when the value of X(n) is configured equal to or a part of the sum of N_A(n) and N_B(n), Alternative 1 may be applied to calculate the number of PDCCH candidates for each AL of the multi-CC DCI of each scheduled cell.

Alternative 2

Alternative 2 is a scheme in which the number of PDCCH candidates for each AL of multi-CC DCI for each scheduled cell is configured to half the number of PDCCH candidates for each AL of multi-CC DCI. That is, each of X_A(n) and X_B(n) may be equal to the value of X(n)/2. Specifically, Alternative 2 is a method of calculating the number of PDCCH candidates by dividing them equally in each of a plurality of scheduled cells.

For example, when X(n) is configured equal to the value of N_C(n) as in Method 1, Alternative 2 may be applied to calculate the number of PDCCH candidates for each AL of the multi-CC DCI of each scheduled cell. As another example, when the value of X(n) is configured equal to or a part of the sum of N_A(n) and N_B(n), as in Method 3, Alternative 2 may be applied to calculate the number of PDCCH candidates for each AL of the multi-CC DCI of each scheduled cell.

Alternative 3

Alternative 3 is a scheme in which the number of PDCCH candidates for each AL of multi-CC DCI for each scheduled cell is configured to a partial value of the number of PDCCH candidates for each AL of multi-CC DCI. That is, alternative 3 is a method of dividing and calculating the number of PDCCH candidates (i.e., X(n)) for each AL of multi-CC DCI in scheduled cells (e.g., cell #A and cell #B).

For example, X_A(n) may be configured to X(n)/R, and X_B(n) may be configured to 1−X(n)/R. At this time, R may mean a value greater than 1, but is not limited thereto. The R value may be predefined or configured (e.g., configured by higher layer signaling). If, as in method 2, the value of X(n) is configured to the value of N_A(n) and alternative 3 is applied, the value of R may be defined/configured so that X_A(n) is greater than X_B(n).

Additionally or alternatively, when Alternative 2 or Alternative 3 applies, if the value of X(n)/R (e.g. X(n)/2) is not an integer, X(n)/R may be replaced with the nearest integer value through calculations based on a ceiling function or a floor function.

Figure 7:
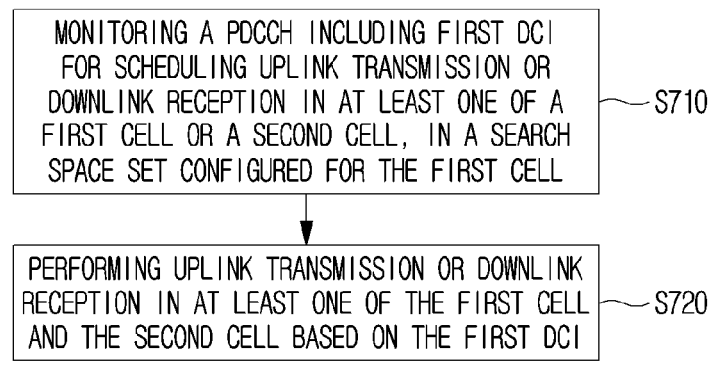
FIG. 7 illustrates a method for a terminal to perform uplink transmission or downlink reception in a wireless communication system to which the present disclosure may be applied.

FIG. 7 illustrates a method for a UE to perform uplink transmission or downlink reception in a wireless communication system to which the present disclosure may be applied.

Each step of FIG. 7 described below may be implemented by the first device 100/second device 200 of FIG. 10 to be described later.

Referring to FIG. 7, the UE may monitor a physical downlink control (PDCCH) channel including first downlink control information (DCI) for scheduling uplink transmission or downlink reception in at least one of the first cell or the second cell, in the search space (SS) set configured for the first cell (S710).

Here, the number of PDCCH candidates for each aggregation level (AL) for the SS set may be configured based on at least one of the number of PDCCH candidates for each AL corresponding to the first cell or the number of PDCCH candidates for each AL corresponding to the second cell. In this case, the number of PDCCH candidates for each AL corresponding to the first cell is the number of PDCCH candidates for each AL set for the search space configured for the first cell, and the number of PDCCH candidates for each AL corresponding to the second cell may be the number of PDCCH candidates for each AL configured for the search space configured for the second cell.

And, the PDCCH transmitted to the first cell may schedule data (e.g., PDSCH or PUSCH, etc.) transmitted to the second cell, and the relationship established between the first cell and the second cell may be referred to as a cross-carrier scheduling (CCS) relationship.

The first DCI (i.e., multi-CC DCI) may schedule uplink/downlink transmission/reception of each of the first cell or the second cell or schedule uplink/downlink transmission/reception of both the first cell and the second cell. Which cell the first DCI will schedule may be configured by higher layer signaling. As another example, a cell to be scheduled by the first DCI may be predefined or set in advance based on a predefined (DCI) format.

For example, the first DCI may be configured/defined to schedule uplink transmission or downlink reception in both the first cell and the second cell or in one of the first cells. When uplink transmission or downlink reception is scheduled in both the first cell and the second cell or in one of the first cells by the first DCI, the number of PDCCH candidates per AL configured for the SS set may be configured to a value equal to or less than the number of PDCCH candidates per AL corresponding to the first cell.

In addition, the UE may expect reception of the first DCI and the second DCI (i.e., single-CC DCI for the second cell) scheduling uplink transmission or downlink reception in the second cell. That is, the UE may monitor the first PDCCH including the first DCI and the second PDCCH including the second DCI in the SS set configured for the first cell.

Additionally or alternatively, uplink transmission or downlink reception may be scheduled/defined in the first cell, the second cell, or one of the first cell and the second cell by the first DCI. When uplink transmission or downlink reception is scheduled in the first cell, the second cell, or one of the first cell and the second cell by the first DCI, the number of PDCCH candidates per AL configured for the SS set may be configured to a value equal to or less than the sum of the number of PDCCH candidates per AL corresponding to the first cell and the number of PDCCH candidates per AL corresponding to the second cell.

And, the UE may expect reception of the first DCI, the second DCI, and the third DCI scheduling uplink transmission or downlink transmission in the first cell. That is, the UE may monitor the first PDCCH including the first DCI, the second PDCCH including the second DCI, and the third PDCCH including the third DCI in the SS set configured for the first cell.

Additionally or alternatively, uplink transmission or downlink reception may be scheduled/defined on the first cell and the second cell by the first DCI. When uplink transmission or downlink reception in the first cell and the second cell is scheduled by the first DCI, the number of PDCCH candidates per AL configured for the SS set may be preconfigured or predefined separately from the number of PDCCH candidates per AL corresponding to the first cell and the number of PDCCH candidates per AL corresponding to the second cell. That is, the number of PDCCH candidates for each AL configured for the SS set may be determined as a preconfigured value or a predefined value independently of the number of PDCCH candidates for each AL corresponding to each cell.

And, the UE may only expect reception of the first DCI. That is, the UE may monitor the first PDCCH including the first DCI in the SS set configured for the first cell.

The number of PDCCH candidates for each AL for monitoring the PDCCH including the first DCI scheduling uplink transmission or downlink reception in the first cell and the number of PDCCH candidates for each AL for monitoring the PDCCH including the first DCI scheduling uplink transmission or downlink reception in the second cell may be separately counted for each of the first cell and the second cell.

For example, the maximum number of PDCCH candidates for each AL for monitoring the PDCCH including the first DCI in the first cell and the maximum number of PDCCH candidates for each AL for monitoring the PDCCH including the first DCI in the second cell, respectively, may be calculated as the same value as the maximum number of PDCCH candidates for each AL configured for the SS set configured for the first cell.

As another example, the maximum number of PDCCH candidates for each AL for monitoring the PDCCH including the first DCI in the first cell and the maximum number of PDCCH candidates for each AL for monitoring the PDCCH including the first DCI in the second cell, respectively, may be half of the maximum number of PDCCH candidates for each AL configured for the SS set configured for the first cell. That is, the maximum number of PDCCH candidates for each cell may be calculated as half of the maximum number of PDCCH candidates for each AL configured for the SS set.

As another example, the maximum number of PDCCH candidates for each AL for monitoring the PDCCH including the first DCI in the first cell may be a part of the maximum number of PDCCH candidates for each AL configured for the SS set configured for the first cell, and the maximum number of PDCCH candidates for each AL for monitoring the PDCCH including the first DCI in the second cell may be the remaining part of the maximum number of PDCCH candidates for each AL configured for the SS set. For example, when the maximum number of PDCCH candidates for each cell configured for the SS set is X, the maximum number of PDCCH candidates corresponding to the first cell is M, and the maximum number of PDCCH candidates corresponding to the second cell may be X−M.

The UE may perform uplink transmission or downlink reception in at least one of the first cell and the second cell based on the first DCI (S720).

The UE may detect (or receive) the PDCCH including the first DCI by monitoring the SS set (i.e., blind decoding). Uplink transmission or downlink reception may be scheduled in at least one of the first cell and the second cell by the first DCI included in the PDCCH. The UE may perform uplink transmission or downlink reception based on scheduling by the first DCI.

Figure 8:
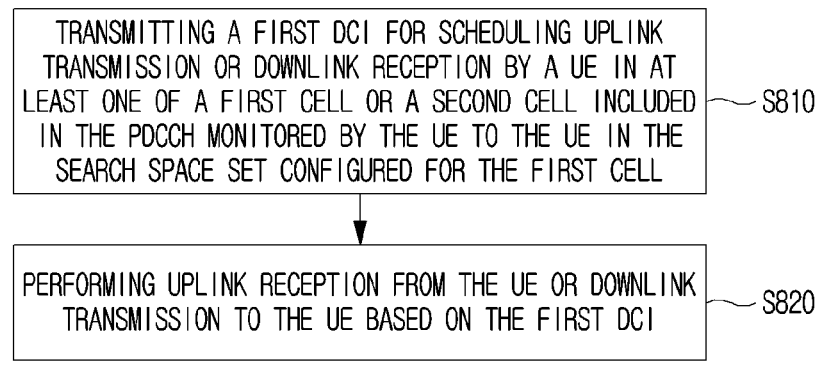
FIG. 8 illustrates a method for a base station to perform uplink reception or downlink transmission in a wireless communication system to which the present disclosure may be applied.

FIG. 8 illustrates a method for a base station to perform uplink transmission or downlink reception in a wireless communication system to which the present disclosure can be applied.

Each step of FIG. 8 described below may be implemented by the first device 100/second device 200 of FIG. 10 to be described later.

Referring to FIG. 8, the base station may transmit a first DCI for scheduling uplink transmission or downlink reception by a UE in at least one of a first cell or a second cell included in the PDCCH monitored by the UE to the UE in the search space set configured for the first cell (S810).

Here, the number of PDCCH candidates for each aggregation level (AL) for the SS set may be configured based on at least one of the number of PDCCH candidates for each AL corresponding to the first cell or the number of PDCCH candidates for each AL corresponding to the second cell. In this case, the number of PDCCH candidates for each AL corresponding to the first cell is the number of PDCCH candidates for each AL set for the search space set configured for the first cell, and the number of PDCCH candidates for each AL corresponding to the second cell may be the number of PDCCH candidates for each AL configured for the search space set configured for the second cell.

And, the PDCCH transmitted to the first cell may schedule data (e.g., PDSCH or PUSCH, etc.) transmitted to the second cell, and the relationship established between the first cell and the second cell may be collectively referred to as a cross-carrier scheduling (CCS) relationship.

The first DCI (i.e., multi-CC DCI) may schedule uplink/downlink transmission/reception of each of the first cell or the second cell or schedule uplink/downlink transmission/reception of both the first cell and the second cell. Which cell is to be scheduled by the first DCI may be set by higher layer signaling or may be predefined.

For example, the first DCI may be configured/defined to schedule uplink transmission or downlink reception in both the first cell and the second cell or in one of the first cells. When uplink transmission or downlink reception is scheduled in both the first cell and the second cell or in one of the first cells by the first DCI, the number of PDCCH candidates per AL configured for the SS set may be configured to a value equal to or less than the number of PDCCH candidates per AL corresponding to the first cell.

In addition, the UE can expect reception of the first DCI and the second DCI (i.e., single-CC DCI for the second cell) scheduling uplink transmission or downlink reception in the second cell. That is, the UE may monitor the first PDCCH including the first DCI and the second PDCCH including the second DCI in the SS set configured for the first cell.

Additionally or alternatively, uplink transmission or downlink reception may be scheduled/defined in the first cell, the second cell, or one of the first cell and the second cell by the first DCI. When uplink transmission or downlink reception is scheduled in the first cell, the second cell, or one of the first cell and the second cell by the first DCI, the number of PDCCH candidates per AL configured for the SS set may be configured to a value equal to or less than the sum of the number of PDCCH candidates per AL corresponding to the first cell and the number of PDCCH candidates per AL corresponding to the second cell.

And, the UE may expect reception of the first DCI, the second DCI, and the third DCI scheduling uplink transmission or downlink transmission in the first cell. That is, the UE may monitor the first PDCCH including the first DCI, the second PDCCH including the second DCI, and the third PDCCH including the third DCI in the SS set configured for the first cell.

Additionally or alternatively, uplink transmission or downlink reception may be scheduled/defined on the first cell and the second cell by the first DCI. When uplink transmission or downlink reception in the first cell and the second cell is scheduled by the first DCI, the number of PDCCH candidates per AL configured for the SS set may be preconfigured or predefined separately from the number of PDCCH candidates per AL corresponding to the first cell and the number of PDCCH candidates per AL corresponding to the second cell. That is, the number of PDCCH candidates for each AL configured for the SS set may be determined as a preconfigured value or a predefined value independently of the number of PDCCH candidates for each AL corresponding to each cell.

And, the UE may only expect reception of the first DCI. That is, the UE may monitor the first PDCCH including the first DCI in the SS set configured for the first cell.

The number of PDCCH candidates for each AL for monitoring the PDCCH including the first DCI scheduling uplink transmission or downlink reception in the first cell and the number of PDCCH candidates for each AL for monitoring the PDCCH including the first DCI scheduling uplink transmission or downlink reception in the second cell may be separately counted for each of the first cell and the second cell.

For example, each of the maximum number of PDCCH candidates per AL for monitoring the PDCCH including the first DCI in the first cell and the maximum number of PDCCH candidates per AL for monitoring the PDCCH including the first DCI in the second cell may be calculated as the same value as the maximum number of PDCCH candidates for each AL configured for the SS set configured for the first cell.

As another example, each of the maximum number of PDCCH candidates for each AL for monitoring the PDCCH including the first DCI in the first cell, and the maximum number of PDCCH candidates per AL for monitoring the PDCCH including the first DCI in the second cell may be half of the maximum number of PDCCH candidates for each AL configured for the SS set configured for the first cell. That is, the maximum number of PDCCH candidates for each cell may be calculated as half of the maximum number of PDCCH candidates for each AL configured for the SS set.

As another example, the maximum number of PDCCH candidates for each AL for monitoring the PDCCH including the first DCI in the first cell is a part of the maximum number of PDCCH candidates for each AL configured for the SS set for the first cell, and the maximum number of PDCCH candidates for each AL for monitoring the PDCCH including the first DCI in the second cell may be the remaining part of the maximum number of PDCCH candidates for each AL configured for the SS set. For example, when the maximum number of PDCCH candidates for each cell configured for the SS set is X, the maximum number of PDCCH candidates corresponding to the first cell may be M, and the maximum number of PDCCH candidates corresponding to the second cell may be X−M.

The base station may perform uplink reception from the UE or downlink transmission to the UE based on the first DCI (S820).

Uplink/downlink transmission and reception may be scheduled in at least one of the first cell and the second cell by the first DCI. The base station may perform uplink reception from the terminal or downlink transmission to the terminal based on the first DCI.

Figure 9:
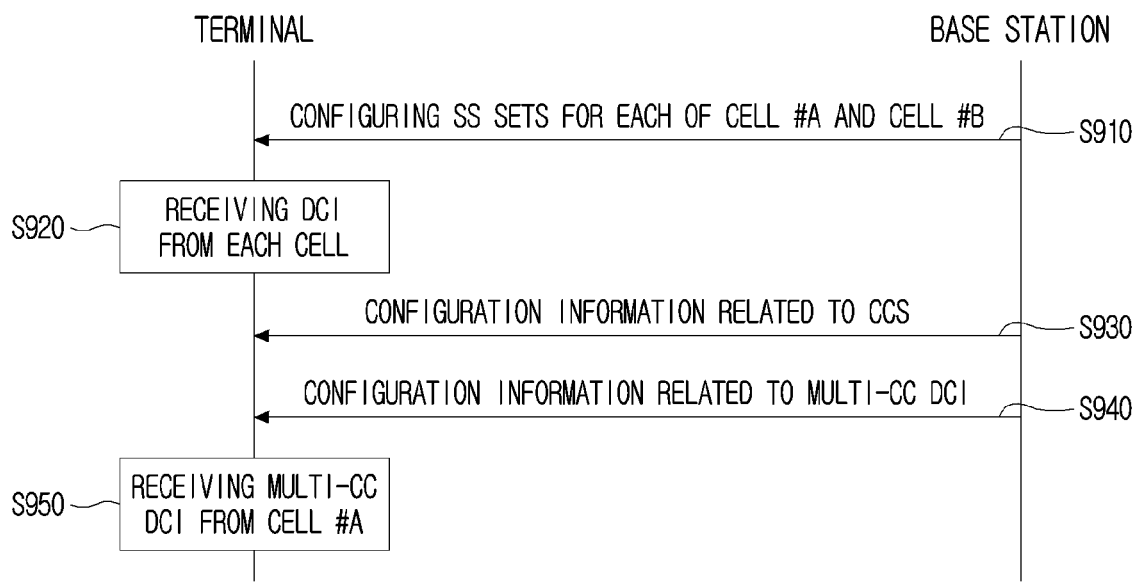
FIG. 9 is a diagram for describing a signaling procedure of a network side and a terminal according to the present disclosure.

FIG. 9 is a diagram illustrating a signaling method between a base station and a UE for transmitting and receiving channel state information according to an embodiment of the present disclosure.

FIG. 9 illustrates an example of signaling between a base station (BS) (or network) and a terminal (UE) to which the embodiments (at least one of Embodiment 1, Embodiment 2, or Embodiment 3 described above) proposed in this disclosure may be applied. Here, the UE/base station is just one example, and may be implemented in various devices. 9 illustrates a signaling flowchart for convenience of description of the present disclosure, and does not limit the scope of the present disclosure. In addition, some of the step(s) illustrated in FIG. 9 may be omitted depending on circumstances and/or configurations.

In the following description, a base station may be one base station including a plurality of TRPs, or may be one cell including a plurality of TRPs. For example, an ideal/non-ideal backhaul may be established between TRP 1 and TRP 2 constituting one base station. In addition, although the following description is based on a plurality of TRPs, it can be equally extended and applied to transmission through a plurality of panels/cells.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID). In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.). In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

Referring to FIG. 9, the base station may configure SS sets for each of cell #A and cell #B (S910). For example, the base station may transmit configuration information for configuring SS sets for each of cell #A and cell #B to the terminal. The SS set may collectively refer to CCE locations where a PDCCH carrying a DCI can be found. SSs may have different sizes according to PDCCH formats, and UE-specific SSs and common SSs may be defined.

The aforementioned steps of FIG. 9 may be implemented by the first device 100 and the second device 200 of FIG. 10 to be described below. The UE may be implemented as the first device 100 and the base station may be implemented as the second device 200 or vice versa. For example, referring to FIG. 10, one or more processors 102/202 may control one or more transceivers 106/206 and/or one or more memories 104/204, etc. to transmit terminal capabilities, and one or more transceivers 106/206 may transmit UE capabilities from a base station.

The UE may receive DCI from each cell (S920). For example, the UE may monitor the SS set configured in each cell. Monitoring may refer to an attempt by a UE to decode received PDCCH candidates according to each DCI format. That is, the UE may obtain (or receive) DCI by performing blind decoding to find a PDCCH carrying DCI in the SS set.

The above procedure may be implemented by the apparatus of FIG. 10 to be described below. For example, referring to FIG. 10, one or more processors 102 may control one or more transceivers 106 and/or one or more memories 104 to perform an uplink channel information acquisition procedure.

The base station may transmit configuration information related to CCS to the UE (S930). For example, the base station may transmit configuration information related to CCS for setting the scheduling cell for cell #B to cell #A to the UE. Configuration information related to CCS may include 'CrossCarrierSchedulingConfig' including information indicating whether a carrier indicator field (CIF) exists or not, a CIF value, and the like. However, it is not limited thereto, and the setting information related to CCS may include various pieces of information necessary to establish a CCS relationship between cell #A and cell #B.

An operation in which the UE (100 or 200 in FIG. 10) receives CCS-related configuration information from the base station (100 or 200 in FIG. 10) in step S930 described above may be implemented by the device of FIG. 10 to be described below. For example, referring to FIG. 10, one or more processors 102 may control one or more transceivers 106 and/or one or more memories 104, etc. to receive the settings, and one or more transceivers 106 may receive the configuration from a base station.

The base station may transmit configuration information related to multi-CC DCI to the UE (S940). That is, the base station may configure the multi-CC DCI to the terminal based on the configuration information. Multi-CC DCI, as described in the above-described embodiment (e.g., one or more of Embodiment 1, Embodiment 2, or Embodiment 3), may mean a DCI capable of scheduling at least one of cell #A or cell #B. That is, multi-CC DCI may schedule both cell #A and cell #B, and can schedule only a single cell (cell #A or cell #B). The UE may expect to receive multi-CC DCI according to the configuration of the base station.

The above-described operation of configuring the multi-CC DCI to the UE by the base station in step S940 may be implemented by the apparatus of FIG. 10 to be described below. For example, referring to FIG. 10, one or more processors 102 may control one or more transceivers 106 and/or one or more memories 104 to receive the reference signal, and one or more transceivers 106 may receive the reference signal from the base station.

The UE may receive multi-CC DCI from cell #A (S950). Here, the multi-CC DCI may schedule a single cell (cell #A or cell #B) or both cell #A and cell #B. The UE may perform scheduled uplink transmission or downlink reception based on the received multi-CC DCI.

For example, an operation in which the UE (100 or 200 in FIG. 10) in step S950 receives the multi-CC DCI may be implemented by the device of FIG. 10 to be described below. For example, referring to FIG. 10, one or more processors 102 may control one or more transceivers 106 and/or one or more memories 104 to perform the CSI measurement.

General Device to which the Present Disclosure May be Applied

Figure 10:
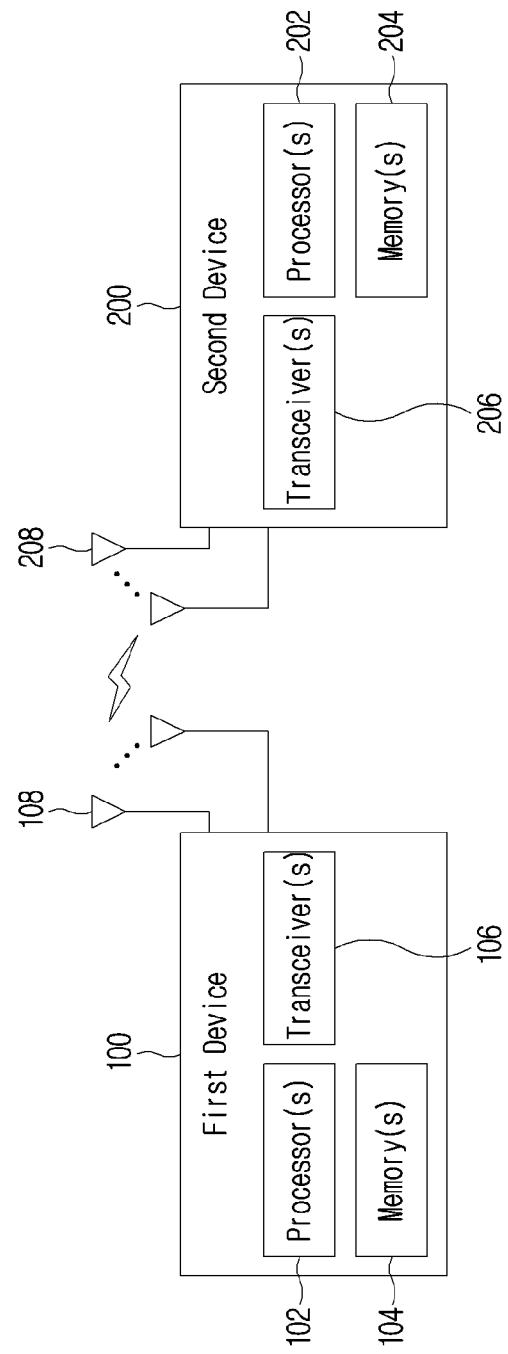
FIG. 10 illustrates a block diagram of a wireless communication system according to an embodiment of the present disclosure.

FIG. 10 is a diagram which illustrates a block diagram of a wireless communication system according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
monitoring, by a user equipment (UE), at least one physical downlink control channel (PDCCH) candidate on a scheduling cell for detection of at least one first downlink control information (DCI) format for scheduling an uplink transmission or a downlink reception on a plurality of serving cells; and performing, by the UE, the uplink transmission or the downlink reception in at least one of the plurality of serving cells based on the at least one first DCI format, wherein, based on search space (SS) sets with a same search space identity (ID) for the at least one first DCI format being provided on the scheduling cell and a scheduled cell among the plurality of serving cells, the scheduled cell is used for counting a number of the at least one PDCCH candidate related to the at least one first DCI format and a number of non-overlapping control channel element (CCE) related to the at least one first DCI format.

2. The method of claim 1, wherein:
the uplink transmission includes at least one physical uplink shared channel (PUSCH) transmission, and
the downlink reception includes at least one physical downlink shared channel (PDSCH) reception.

3. The method of claim 1, wherein a radio resource control (RRC) message related to a cross carrier scheduling is transmitted from a base station to the UE.

4. The method of claim 1, wherein a maximum number of monitored PDCCH candidates per slot and a maximum number of non-overlapped CCEs per slot are based on a subcarrier spacing (SCS) for a cell.

5. A user equipment (UE) comprising:
at least one transceiver; and
at least one processor,
wherein the at least one processor is configured to:
monitor at least one physical downlink control channel (PDCCH) candidate on a scheduling cell for detection of at least one first downlink control information (DCI) format for scheduling an uplink transmission or a downlink reception on a plurality of serving cells; and
perform the uplink transmission or the downlink reception in at least one of the plurality of serving cells based on the at least one first DCI format,
wherein, based on search space (SS) sets with a same search space identity (ID) for the at least one first DCI format being provided on the scheduling cell and a scheduled cell among the plurality of serving cells, the scheduled cell is used for counting a number of the at least one PDCCH candidate related to the at least one first DCI format and a number of non-overlapping control channel element (CCE) related to the at least one first DCI format.

6. A base station performing comprising:
at least one transceiver; and
at least one processor,
wherein the at least one processor is configured to:
transmit, to a user equipment (UE) through the at least one transceiver, at least one first downlink control information (DCI) format for scheduling an uplink reception or a downlink transmission on a plurality of serving cells; and
perform the uplink reception or the downlink transmission in at least one of the plurality of serving cells based on the at least one first DCI format through the at least one transceiver,
wherein, based on search space (SS) sets with a same search space identity (ID) for the at least one first DCI format being provided on a scheduling cell and a scheduled cell among the plurality of serving cells, the scheduled cell is used for counting a number of at least one physical downlink control channel (PDCCH) candidate related to the at least one first DCI format and a number of non-overlapping control channel element (CCE) related to the at least one first DCI format.

* * * * *